(12) United States Patent
Solomon et al.

(10) Patent No.: US 8,046,238 B2
(45) Date of Patent: Oct. 25, 2011

(54) BUSINESS TRANSACTION MANAGEMENT

(75) Inventors: Stuart J. Solomon, Great Falls, VA (US); Burrell G. Kilmer, Timonium, MD (US); Casey C. Wells, Carmel, NY (US); Kyle K. Jordan, Frederick, MD (US); Matthew W. Mehok, Durham, NC (US); Timothy J. Saffell, Denver, CO (US); Benjamin J. Hendershot, Columbus, OH (US); Stewart J. J. Anderson, South Melbourne VIC (AU)

(73) Assignee: Accenture Global Services Limited, Dublin (IE)

( * ) Notice: Subject to any disclaimer, the term of this patent is extended or adjusted under 35 U.S.C. 154(b) by 355 days.

(21) Appl. No.: 10/027,664

(22) Filed: Dec. 20, 2001

(65) Prior Publication Data

US 2004/0015435 A1 Jan. 22, 2004

(51) Int. Cl.
*G06Q 10/00* (2006.01)
*G07F 19/00* (2006.01)

(52) U.S. Cl. .............. 705/1.1; 705/34; 705/30; 705/8

(58) Field of Classification Search .............. 705/1, 7, 705/8, 9, 10, 11, 26, 27, 30, 34, 35, 36, 39, 705/40, 400, 80, 1.1, 28, 29, 32, 42, 412, 705/413
See application file for complete search history.

(56) References Cited

U.S. PATENT DOCUMENTS

| | | | |
|---|---|---|---|
| 5,918,216 A * | 6/1999 | Miksovsky et al. | 705/35 |
| 5,987,429 A * | 11/1999 | Maritzen et al. | 705/31 |
| 6,233,565 B1 * | 5/2001 | Lewis et al. | 705/35 |
| 6,658,568 B1 * | 12/2003 | Ginter et al. | 713/193 |
| 6,912,502 B1 * | 6/2005 | Buddle et al. | 705/1 |
| 7,085,739 B1 * | 8/2006 | Winter et al. | 705/37 |
| 7,133,846 B1 * | 11/2006 | Ginter et al. | 705/54 |
| 7,162,428 B1 * | 1/2007 | Rosenthal et al. | 705/1 |
| 7,165,174 B1 * | 1/2007 | Ginter et al. | 713/153 |
| 7,167,844 B1 * | 1/2007 | Leong et al. | 705/80 |
| 2002/0023109 A1 * | 2/2002 | Lederer et al. | 707/511 |
| 2002/0116205 A1 * | 8/2002 | Ankireddipally et al. | 705/1 |
| 2002/0120477 A1 * | 8/2002 | Jinnett | 705/4 |
| 2002/0169664 A1 * | 11/2002 | Walker et al. | 705/14 |
| 2002/0188535 A1 * | 12/2002 | Chao et al. | 705/35 |
| 2003/0004840 A1 * | 1/2003 | Gharavy | 705/30 |
| 2003/0036922 A1 * | 2/2003 | Fries | 705/1 |
| 2003/0061058 A1 * | 3/2003 | Dutta et al. | 705/1 |
| 2003/0101112 A1 * | 5/2003 | Gallagher et al. | 705/31 |
| 2003/0105722 A1 * | 6/2003 | Welt | 705/64 |

FOREIGN PATENT DOCUMENTS

JP 410283415 A * 10/1998

(Continued)

OTHER PUBLICATIONS

Sullivan, Robert L. Electronic Commerce With EDI; Twain, Inc., 1998 pp. 1-7.*

(Continued)

*Primary Examiner* — Igor Borissov (74) *Attorney, Agent, or Firm* — Fish & Richardson P.C.

(57) ABSTRACT

A method and system of managing business transactions includes receiving at least one business transaction, determining whether the business transaction satisfies at least one configurable business rule, and establishing a subsequent business transaction based on the results.

20 Claims, 2 Drawing Sheets

FOREIGN PATENT DOCUMENTS

| | | |
|---|---|---|
| WO | WO 00/29924 | 5/2000 |
| WO | WO 01/57613 | 8/2001 |
| WO | WO 01/67280 | 9/2001 |

OTHER PUBLICATIONS

O'Brien "Computers in Business Management", 1979, 5 pages.*
Al Senia The Internet Forefront, the Internet print out, Oct. 2000; 3 pages.*
Murphy "Banking Online for Dummies", 1999, 6 pages.*
Wilkinson, Accounting Information Systems, $4^{th}$ ed. 2000, 11 pages.*
Martin: Analysiss and Design of Business Information Systems, 1995, 4 pages.*
Peachtree: Using Accounts Receivable and Invoicing, 1989, 4 pages.*
Communication from European Patent Office dated Dec. 14, 2007.
Communication from European Patent Office dated Oct. 14, 2008.

* cited by examiner

BUSINESS TRANSACTION MANAGEMENT

TECHNICAL FIELD

This invention relates to business transaction management, and more particularly to a business rules based transaction management system for use in restructured electric and gas retail supplier markets.

BACKGROUND

Deregulation in the energy industry has created a complex set of business requirements for market participants such as utility companies and energy suppliers. The introduction of retail choice among energy suppliers requires data flow between market participants to facilitate business events such as customer enrollment/switching, metered usage/billing/payment, load aggregation and settlements, customer account data maintenance, and other business events. Business transactions make up the business events which are validated using business rules.

Market participants may be required to exchange data in the form of business transactions with other market participants. However, these market participants may be located in different jurisdictions including other states or other countries which may have different laws, rules, and regulations. Moreover, the market participants may have adopted different business events, business rules, and business transactions having different standards, protocols, and formats.

SUMMARY

In one aspect, the invention discloses a method that includes receiving at least one business transaction, determining whether the business transaction satisfies a configurable business rule, and establishing a subsequent business transaction based on the results.

The aforesaid method may provide a configurable business rule that specifies a relationship between the received business transaction and the subsequent business transaction. The configurable business rule may be configured based on at least one of: (i) a jurisdiction associated with the received business transaction, (ii) a time relationship between the received business transaction and a subsequent business transaction, and (iii) a business event associated with the received business transaction. The method may further include processing business transactions having different formats. The method may also further include sending a message indicating that the business transaction does not satisfy a configurable business rule.

In second aspect, the invention provides an apparatus adapted to perform the methods disclosed above.

In a third aspect, the invention provides an article comprising a computer-readable medium that stores computer executable instructions or causing a computer system to perform the methods disclosed above In a fourth aspect, the invention provides a method of accessing a system that is configured to perform the methods disclosed above.

In a fifth aspect, the invention provides an apparatus adapted to perform the methods disclosed above.

In a sixth aspect, the invention provides an article comprising a computer-readable medium that stores computer executable instructions or causing a computer system to perform the methods disclosed above.

In various implementations, the invention may provide one or more of the following advantages. Market participants such as utility companies may be permitted to exchange business transactions with energy suppliers that span different jurisdictions. Energy suppliers may also be permitted to transmit business transactions having different data formats and transmission protocols by having the invention map each business transaction with a different format into a standard format for internal processing. The invention is capable of interfacing to an existing computing environment seamlessly. As a result of being capable of handling different operating environments, market participants can quickly enter new markets, adapt to regulatory changes and thus improve business performance.

In addition, the invention uses a configurable business rules based approach in which each business transaction is associated with one or more business rules. The business rules may be established by the utility company and the energy supplier and can be easily configured and dynamically updated. The utility company can then automatically track each business transaction and its lifecycle and to configure each business rule according to the requirements of each energy supplier.

The invention offers various benefits to market participants such as providing a scalable architecture which can support both small and large market participants. The invention is based on a robust architecture and can also support extensive business transaction volume in dynamic and vibrant market conditions. The invention can be implemented using an application service provider (ASP) delivery approach permitting market participants to use and benefit from the invention with minimal computer resources and information technology (IT) commitments. The invention includes operational efficiencies such as the ability to report operational failures allowing improved problem resolution and improved customer service.

The invention has data warehousing capabilities allowing users to generate ad hoc reports and perform data mining activities based on the transaction and business event data. Data mining can be used to analyze data stored in the data warehouse for relationships that have not previously been discovered. The results of data mining may include producing correlations between data, classification of the data, clustering the data, forecasting based on the data, and other results. In addition, the transaction management services provided by the invention can be integrated with other application services such as customer relationship management (CRM), supply chain management (SCM), retail billing, remittance, scheduling and settlements, or other application services.

The invention is described in the context of the energy industry for ease of explanation; however, the ideas behind the invention can be applied to any industry that requires market participants such as trading partners to exchange information. For example, the invention can be used in industries such as the airline, banking, transportation, and other industries.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
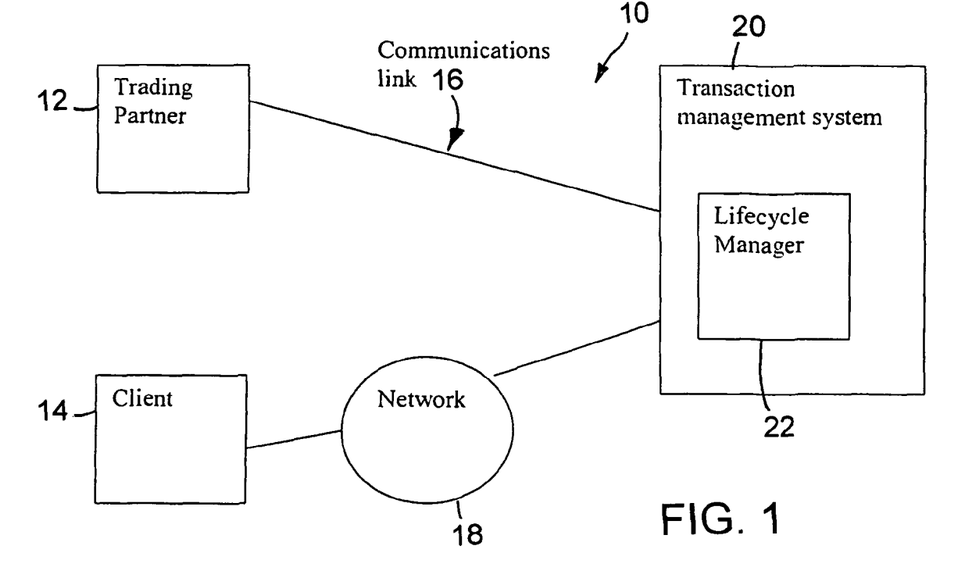
FIG. 1 is a simplified block diagram of a computer network system according to an implementation of the invention.

FIG. 1 is a simplified block diagram of a computer network system 10 according to an implementation of the invention. The invention is described herein in the context of the energy industry for ease of understanding. However, one skilled in the art recognizes that the invention can be applied to any industry that requires trading partners to exchange information.

Referring to FIG. 1, the computer network system 10 includes one or more trading partners such as trading partner 12 who exchanges messages containing business transactions with a transaction management system 20 over a communications link 16. The trading partner 12 can refer to an energy supplier competing in a deregulated energy market who supplies energy to customers. The business transactions can be part of a business event or business process such as a customer enrollment process in which a particular energy supplier agrees to provide energy to particular customers.

The trading partner 12 can be embodied as a computing device that is capable of communicating with the transaction management system 20 over the communications link 16. Although one trading partner 12 is illustrated, there can be a plurality of trading partners that can be located in different jurisdictions communicating with the transaction management system 20. A jurisdiction can include a sovereign region that has established laws and regulations that are independent and perhaps different from those of other regions.

The trading partner 12 can communicate with the transaction management system 20 in the form of messages which may include batch files containing at least one business transaction. Each business transaction can be organized according to a single or multiple data records containing data fields. Each business transaction may be specified as a pair, for example, a request for a business transaction and an expected response. The pair may thus include a request business transaction and a response business transaction. In addition, each business transaction may be associated with a business rule that includes lifecycle information regarding the relationship between the request for a business transaction and the response.

The lifecycle information can include information related to the business process or event. For example, lifecycle information can include a predetermined time period specifying when a response to a request for a business transaction is due, and what action to take if the response is not received within the predetermined time period. In another example, when a customer enrolls with an energy supplier to receive energy, a request business transaction is created as part of the enrolling process. A business rule associated with the enrolling process can specify that a response business transaction should be received within a 3 day time period. The business rule can further specify that if the response is not received within the time period, then an exception message should be generated indicating that an exception or error condition has occurred. An energy supplier could then send a reminder to the customer to inform him/her that a response has not been received.

The batch files containing the business transactions may be packaged according to formats that are unique to a trading partner 12 located within a particular jurisdiction. For example, the trading partner 12 may send a batch file in a flat file format, in an electronic data interchange (EDI) format, in an extensible markup language (XML) format, or other format. The communications link 16 may operate according to different communications protocols such as file transfer protocol (FTP), hypertext transfer protocol (HTTP), or other protocol.

The communications link 16 can be a bi-directional communications channel allowing the trading partner 12 or the client 14 to exchange data such as batch files containing business transaction or messages with the transaction management system 20. For example, the transaction management system 20 can send a message to the trading partner 12 confirming the receipt of a business transaction. The transaction management system 20 supports messages and business transactions in one or more communication formats or protocols. Although one communications link 16 is shown, there can be a plurality of communication links that can be used by the trading partner 12. In addition to using wired communications techniques, the communications link can be configured to use wireless techniques such as infrared, radio-frequency, or other techniques.

The transaction management system 20 can be implemented as a server computer configured to handle business transactions associated with business processes. The system 20 can also manage business rules and lifecycles associated with the business transactions. The system 20 may include a lifecycle manager 22 which provides flexible business rules-based techniques for determining the validation, business lifecycle, and exception/error conditions for various business transaction types, and for each trading partner 12, wherein trading partners may span different jurisdictions. The transaction management system 20 and the lifecycle manager 22 will be discussed below in further detail.

In the implementation shown in FIG. 1, a client 14 communicates with the transaction management system 20 over a network 18. The client 14 can include a power company or a utility that is responsible for billing, enrolling, registering, and pricing energy provided by a trading partner 12 and consumed by a customer. Although one client 14 is illustrated, there can be a plurality of clients connected to the transaction management system 20 over the network 18. In one embodiment, the client 14 can be implemented as a PC running a Web browser connected to the network 18 such as the Web.

Figure 2:
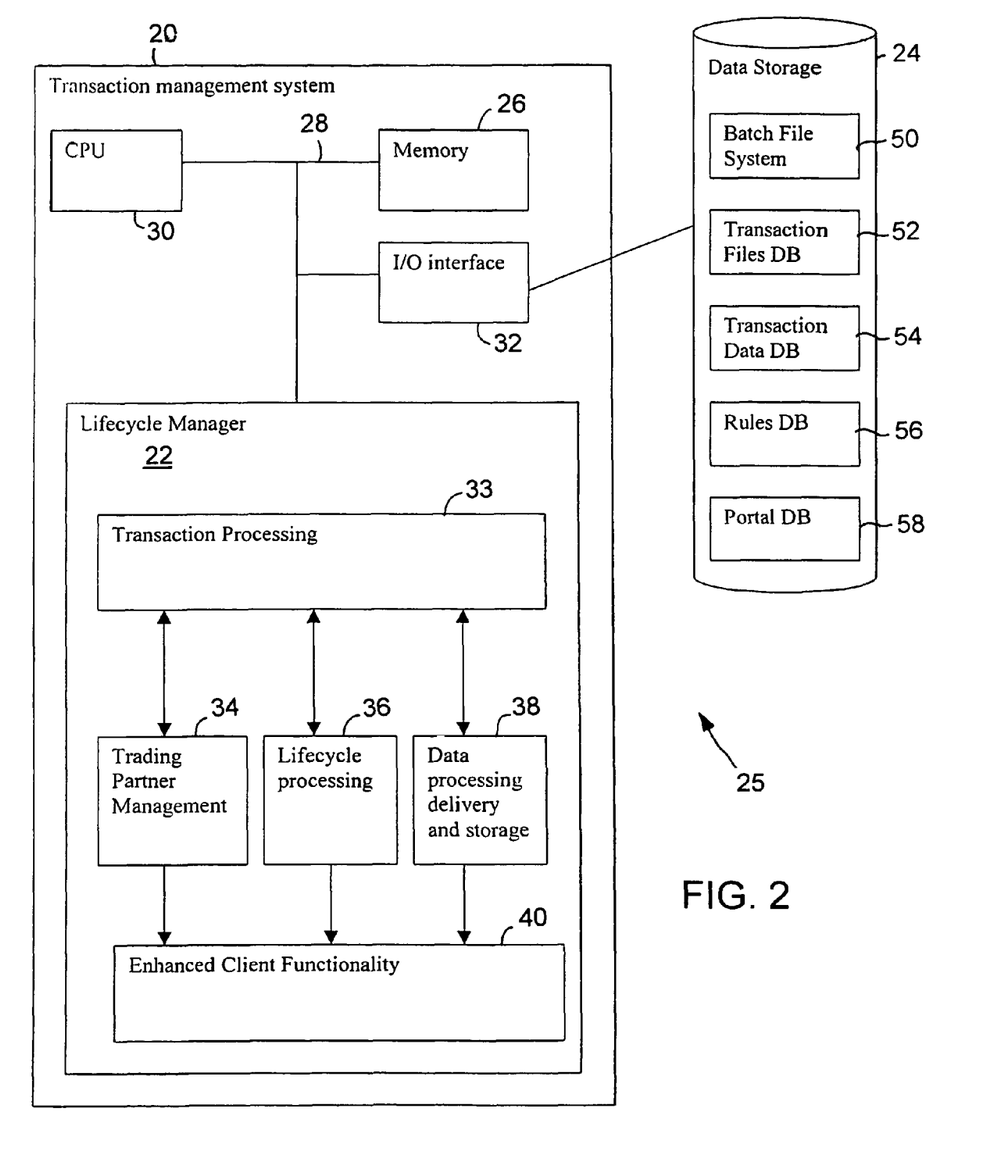
FIG. 2 is a detailed block diagram of a computer system according to an implementation of the invention.

FIG. 2 is a detailed block diagram of a computer system according to an implementation of the invention. The transaction management system 20 can be implemented as a single server computer that includes a computer bus 28 connecting a central processing unit (CPU) 30 to memory 26. The CPU 30 is capable of executing programs residing in memory 26 and processing data stored in memory. The programs can include an operating system (OS) such as Microsoft® Windows® 2000 server, a process orchestration system such as Microsoft® BizTalk server, and a database server such as Microsoft® SQL Server 2000. Custom application components may be used to implement certain business transaction rules. The CPU 30 can include an Intel® Pentium® Processor or other processor. The memory 26 can be a combination of read only memory (ROM), random access memory (RAM), static random access memory (SRAM), dynamic random access memory (DRAM), or other memory.

An input/output (I/O) interface 32 may include a set of hardware and software elements to permit peripherals to be coupled to the transaction management system 20. For example, the I/O interface 32 may be utilized to connect the transaction management system 20 to the network 18 shown in FIG. 1, which may include the Internet, a local area network (LAN), or other network. The I/O interface 32 also could be used for coupling the system 20 to the communications link 16, and may be capable of supporting multiple communications protocols such as FTP, HTTP, EDI, and/or other communications protocols.

As shown in FIG. 2, the I/O interface 32 may also be used to couple the transaction management system 20 to data storage 24. The data storage 24 can be implemented using storage devices such as hard disk drives, optical drives, a redundant array of inexpensive drives (RAID), or other storage devices. The data storage 24 can be configured to support multiple file systems and databases for storing data such as message and batch files that contain business transactions, business rules, and other data that can be used by the transaction management system 20. Such databases can be implemented using a database program such as Microsoft structured query language (SQL) 2000 or other database program.

In addition, the I/O interface 32 could be used to couple the system 20 to an input device such as a keyboard to allow manual entry of data by a user. An output device such as a display monitor can also be attached to the I/O interface 32 to allow data from the transaction management system 20 to be viewed by a user.

The transaction management system 20 can be a combination of hardware and software modules capable of managing business processes and business transactions. The transaction manager 20 may include a transaction processing module 33 that is responsible for ensuring that the structure of the business transactions received from a trading partner 12 or a client 14 are correct so that they can be further processed. The transaction processing module 33 is capable of handling messages and batch files containing business transactions from different trading partners 12 and clients 14. It can also handle messages and batch files that are exchanged using different protocols and arranged using different formats with different trading partners 12 and clients 14.

The batch files containing the business transactions can be received using file exchange protocols such as FTP, HTTP, database record techniques, and direct file system access methods, or other exchange protocols. The batch files can be structured according to different formats such as XML, EDI, and may be in a delimited flat file format, or other format. The batch files containing the business transactions can be stored in a batch file system 50 housed in the data storage 24.

The transaction processing module 33 is capable of parsing out the individual business transactions contained in the batch file. A transaction files database 52 can be used to store the parsed business transaction in the native format in which they were received. The business transactions may also be mapped into an internal standard format such as XML for ease of subsequent processing within the transaction management system 20.

The transaction processing module 33 can validate the business transactions. Validation may include checking whether the batch file and the business transactions contained in the batch file adhere to the particular format and protocol used to transmit the file. The results of the validation process can be communicated to the trading partner 12 or client 14 by sending a message confirming the receipt and status of the business transactions.

A trading partner management module 34 manages and defines the relationship between a trading partner 12 and a client 14. For example, the module 34 can create and incorporate information related to a new trading partner 12 into the transaction management system 20 to allow it to begin processing business transactions from the new trading partner. It can also provide the client 14 with the ability to edit and view contact information related to each trading partner 12. In addition, it may permit the client 14 to create, edit, delete, and view user roles between the client and a trading partner 12.

A lifecycle processing module 36 uses a business rule and lifecycle management approach to ensure that the appropriate business transactions are processed at the right time by the appropriate trading partner. The lifecycle processing module 36 includes a configurable business rules engine that maintains the business rules for each client, trading partner, and business process. The business rules can be configured based on the needs or requirements of the client, the trading partner, and the jurisdiction of the trading partner.

For example, as discussed earlier, when a customer enrolls with an energy supplier to receive energy, a request business transaction is created as part of the enrolling process. According to a business rule associated with a trading partner in operating in one jurisdiction, the enrolling process can require that a response business transaction be received within a certain time period such as 3 days. The client can establish a relationship with a new trading partner operating in jurisdiction different than the first trading partners such that the time period for response is 2 days. The configurable business rules engine allows the client to add a new business rule corresponding to the new requirements of the new trading partner. In addition, the business rules engine allows the client to update a current requirement of the business rules, such as changing the time period from 3 days to 2 days. This can be accomplished by having the client communicate the new requirements over network 18. Thus, the client can quickly and electronically add or update the requirements that comprise business rules.

The lifecycle processing module 36 may also be capable of tracking the lifecycle associated with a business process. This may include matching a request business transaction with a corresponding response business transaction in order to determine whether the transactions have satisfied the lifecycle associated with the business process. For example, when a customer enrolls with an energy supplier, the customer is sent an enrollment notification letter. The lifecycle of the enrollment process may specify that a response from the customer in the form of a business transaction must be received within a certain time period.

In another business process example, a trading partner 12 may send a usage business transaction to the client 14 indicating the amount of power a customer has consumed during a certain time period such as a month. A bill containing the amount of usage is sent to the customer requesting payment for the amount of power consumed. The lifecycle of the business process may specify that a response from the customer is expected within a certain time period. The response can also be based on factors such as the jurisdiction of the trading partner 14, the policy of the client 12, and/or other factors.

The lifecycle processing module 36 also can set the next expected business transaction. It maintains tracking information related to each business transaction to enable a client to manage certain events. For example, on the next meter reading date a usage business transaction would be expected from the trading partner.

A data processing delivery and storage module 38 provides advanced validation and operational reporting of business transactions. Business transactions may be validated to ensure that codes and values in the data fields passed in the business transactions are valid. Data may be extracted from each validated business transaction and stored in a transaction data database 54 for later retrieval and analysis.

The data processing delivery and storage module 38 may also manage exception and validation rules for each jurisdiction, client 14, and trading partner 12. A rules database 56 may be used to store business validation rules associated with each business transaction and business process. The module 38 is capable of detecting a business rule exception condition such as when a response business transaction fails to arrive within a predetermined time period or is delayed in arriving. When the exception is detected, the module 38 can report the exception condition as an error message to the client 14 or the trading partner 12. The module 38 can also handle business transaction validation failures, overdue business transaction exceptions, and unsolicited business transactions.

An enhanced client functionality module 40 may provide the client with Internet access to business transactions and business transaction exceptions over the network 18 using HTTP. By using HTTP, the module 40 is able to provide the client 14 with Web home page that can be customized. The module 40 maintains secure network access by utilizing a portal database 58 containing information about each client such as password and login data.

The client 12 is also given the ability to access business transactions and exceptions conditions using criteria such as trading partner, transaction type, or other criteria. The history and status of business transactions may also be available. Business transaction details can also be viewed including key fields or raw transaction data. In addition, the client 14 can either automatically or manually edit or resubmit business transactions over the network 18.

Figure 3:
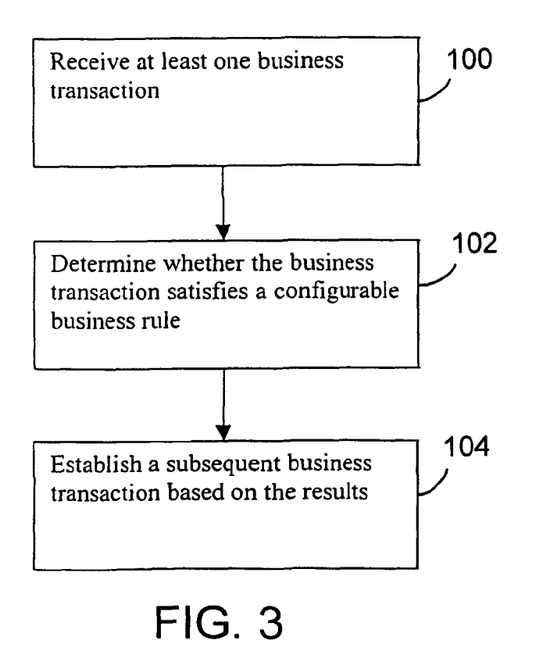
FIG. 3 is a flow chart according to an implementation of the invention.

FIG. 3 is a flow chart according to an implementation of the invention. The transaction management system 20 (see FIG. 2) receives 100 at least one business transaction from the trading partner 12 over the communications link 16 or from the client 14 over the network 18. The business transaction can be received in a batch file format that may contain one or more business transactions. As discussed above, the transaction management system 20 can handle batch files that may be in one or more formats or that may have been transmitted using one or more protocols. The batch file is stored in the batch file system 50 for archival purposes.

In an implementation, the batch file is parsed and each business transaction that is extracted from the batch file is structurally validated to ensure that each transaction is formatted correctly. The results of the validation process may be communicated back to the client 14 or the trading partner 12 in the form of a message. Each validated business transaction may be stored in the transaction file database 52. The business transactions are typically formatted according to one or more different formats. So, to improve internal business transaction processing, each business transaction maybe mapped to a common standard such as XML.

Once the transaction management system 20 has received the business transactions, it determines 102 whether each business transaction satisfies a particular business rule. In this implementation, a business rule associated with the business transaction is retrieved from the rules database 56. Then, the criteria in the business rule is applied to the business transaction to determine whether it satisfies the criteria. For example, a business transaction may contain a time stamp data field indicating when it was generated. The value in the time stamp data field may be compared to the time period specified in the business rule to determine whether it has been received within the time period.

If the business transaction satisfies the corresponding business rule, then the transaction management system 20 establishes 104 a subsequent business transaction based on information contained in the business rule. In the above example, if the business transaction was received within the specified time period, then the transaction management system 20 queries the rules database 56 and retrieves the corresponding business rule to determine the next expected transaction. The transaction management system 20 monitors the sequence of business transactions over the course of the lifecycle of a business process. For example, a business process can include enrolling a customer with an energy supplier. A request business transaction is generated corresponding to the enrolling process. The business rule can specify the next expected business transaction, such as a response, and within what time period the transaction should be received such as 3 days.

On the other hand, if the business transaction does not satisfy the criteria specified in the business rule, then an exception or error condition is raised. For example, an exception condition is raised when an expected business transaction never takes places or when an unsolicited business transaction is received without any apparent business rule. The transaction management system 20 can store the exception condition in the transaction data database 56 for later retrieval and error analysis. In addition, a message can be sent to the trading partner 12 or client 14 indicating that an exception condition has occurred.

In addition, certain data from fields in the business transaction can be extracted from the business transaction and stored in the transaction data database 56. The client can access and retrieve the data from the transaction data database 56 for the purpose of analyzing the information related to the business transaction. Such information includes business transaction history and status, the number and type of exception or errors that occurred during a certain time period, or other information.

A number of embodiments of the invention have been described. Nevertheless, it will be understood that various modifications may be made without departing from the spirit and scope of the invention. For example, the functionality of the transaction management system 20 can be distributed over several computer servers rather than clustered in a single server. Functions such as handling business transactions can be offloaded to a separate server running, for example, Microsoft® BizTalk, the functionality of the lifecycle manager can be placed in an application server running a server application such as, Microsoft® 2000 server, and a separate web server can be used to manage the client access portion. Accordingly, other embodiments are within the scope of the following claims.

What is claimed is:

1. A method comprising:

receiving electronically, at a computer system, a first transaction record from an energy supplier that is located in a first jurisdiction and that supplies energy to customers in an energy market, the first transaction record being received according to a first protocol, and the first transaction record having a first format and including first transaction data stored in the first format and describing a customer enrollment transaction between the energy supplier and a customer located in a second jurisdiction;

converting, by the computer system, the first transaction data from the first format into a second format;

configuring business rules based on the first jurisdiction of the energy supplier and the second jurisdiction of the customer, the configured business rules being appropriate for handling transactions in accordance with jurisdictional requirements for energy transactions engaged in by the energy supplier;

accessing, from among the configured business rules by the computer system and based on information in the first transaction record, a first business rule describing a response business transaction expected to be completed between the energy supplier and the customer in response to the customer enrollment transaction, the first business rule including an acceptable time period in which the response business transaction is required to be completed to comply with jurisdictional requirements imposed by the first jurisdiction of the energy supplier and the second jurisdiction of the customer;

receiving, by the computer system, a second transaction record from the energy supplier including second transaction data describing completion of the response business transaction and including a time attribute related to a time of completion of the response business transaction;

processing, by the computer system, the second transaction record using the first business rule, the processing including:
based on the time attribute included in the second transaction record received from the energy supplier, determining a time period between completion of the customer enrollment transaction between the energy supplier and the customer and completion of the response business transaction between the energy supplier and the customer;
comparing the determined time period with the acceptable time period included in the first business rule;
based on comparison results, determining, by the computer system, whether the response business transaction between the energy supplier and the customer was completed within the acceptable time period; and
processing the second transaction record based on whether the response business transaction between the energy supplier and the customer was completed within the acceptable time period;

tracking, by the computer system, information related to business transactions between the energy supplier and the customer to identify a schedule of recurring transactions that occur in a lifecycle of business between the energy supplier and the customer;

determining, by the computer system and in response to processing the second transaction record, a next expected energy usage business transaction between the energy supplier and the customer and a second time period of when the next expected energy usage business transaction is expected to be received based on the tracked schedule of recurring transactions that occur in the lifecycle of business between the energy supplier and the customer;

storing, by the computer system, at least some portions of the first transaction record and the second transaction record; and displaying the results of the processing and storing, by the computer system, to at least one of the energy supplier and the customer.

2. The method of claim 1 wherein:
receiving the second transaction record from the energy supplier comprises receiving the second transaction record according to the first protocol, with the second transaction record having the first format and including the second transaction data stored in the first format and describing the response business transaction between the energy supplier and the customer; and
processing the second transaction record comprises:
converting the second transaction data from the first format into the second format;
determining in an automated manner whether the first business rule is satisfied by the second transaction data;
accessing, when the first business rule is satisfied, a second business rule configured by the energy supplier and describing a third transaction expected to be completed between the energy supplier and the customer in response to the response business transaction; and
receiving a third transaction record from the energy supplier including third transaction data describing completion of the third transaction.

3. The method of claim 2 further comprising repeating the operations of converting, determining, accessing, and receiving from claim 2 for a series of successive transactions between the energy supplier and the customer, each of the series of successive transactions between the energy supplier and the customer identifying a succeeding transaction in the series through a business rule.

4. The method of claim 1 wherein:
receiving the second transaction record from the energy supplier comprises receiving the second transaction record according to the first protocol, with the second transaction record having the first format and including the second transaction data stored in the first format and describing the response business transaction between the energy supplier and the customer; and
processing the second transaction record comprises:
converting the second transaction data from the first format into the second format;
determining whether the first business rule is satisfied by the second transaction data; and
informing the energy supplier of whether the first business rule is satisfied.

5. The method of claim 4 wherein determining whether the first business rule is satisfied comprises determining whether the second transaction was completed within a time period required by the first business rule.

6. The method of claim 1 further comprising:
receiving a third transaction record from the energy supplier, the third transaction record being received according to the first protocol, and the third transaction record having the first format and including third transaction data stored in the first format and describing a completed third transaction between the energy supplier and the customer;
converting the third transaction data from the first format into the second format;
determining that the third transaction is an unexpected transaction, an unexpected transaction being a transaction that is expected to succeed a given transaction that has not been completed; and
informing the energy supplier that the third transaction is an unexpected transaction.

7. The method of claim 1 further comprising:
receiving a third transaction record from another energy supplier, the third transaction record being received according to another protocol, and the third transaction record having another format and including third transaction data stored in the other format and describing a completed third transaction between the other energy supplier and another customer;
converting the third transaction data from the other format into the second format;
accessing, based on information in the third transaction record, a third business rule configured by the other energy supplier and describing a fourth transaction expected to be completed between the other energy supplier and the other customer in response to the completed third transaction; and receiving a fourth transaction record from the other energy supplier including fourth transaction data describing completion of the fourth transaction.

8. The method of claim 7 wherein receiving the fourth transaction record comprises receiving the fourth transaction record according to the other protocol, with the fourth transaction record including the fourth transaction data stored in the other format and describing a completed fourth transaction between the other energy supplier and the other customer, the method further comprising:

converting the fourth transaction data from the other format into the second format;

determining, by the computer system, whether the third business rule is satisfied by the fourth transaction data;

accessing, based on whether the third business rule is satisfied, a fourth business rule configured by the other energy supplier and describing a fifth transaction expected to be completed between the other energy supplier and the other customer in response to the completed fourth transaction; and receiving a fifth transaction record from the other energy supplier including fifth transaction data describing completion of the fifth transaction.

9. The method of claim 8 further comprising repeating the operations of converting, determining, accessing, and receiving from claim 8 for a series of successive transactions between the other energy supplier and the other customer, each of the series of successive transactions between the other energy supplier and the other customer identifying a succeeding transaction in the series through a business rule.

10. The method of claim 3 further comprising:

receiving a fourth transaction record from another energy supplier, the fourth transaction record being received according to another protocol, and the fourth transaction record having another format and including fourth transaction data stored in the other format and describing a completed fourth transaction between the other energy supplier and other customer;

converting the fourth transaction data from the another format into the second format;

accessing, based on information in the fourth transaction record, a fourth business rule configured by the other energy supplier and describing a fifth transaction expected to be completed between the other energy supplier and the other customer in response to the completed fourth transaction;

receiving a fifth transaction record from the other energy supplier including fifth transaction data describing completion of the fifth transaction;

receiving the fifth transaction record from the other energy supplier, the fifth transaction record being received according to the other protocol, and the fifth transaction record having the other format and including the fifth transaction data stored in the other format and describing a completed fifth transaction between the other energy supplier and the other customer;

converting the fifth transaction data from the other format into the second format;

determining, by the computer system, whether the fourth business rule is satisfied by the fifth transaction data;

accessing, based on whether the fourth business rule is satisfied, a fifth business rule configured by the other energy supplier and describing a sixth transaction expected to be completed between the other energy supplier and the other customer in response to the completed fifth transaction;

receiving a sixth transaction record from the other energy supplier including sixth transaction data describing completion of the sixth transaction; and repeating the operations of receiving a transaction record of an expected transaction, converting a format of the transaction record of the expected transaction to a second format, determining whether the transaction record of the expected transaction satisfies a business rule, accessing a further business rule describing a further transaction expected to be completed, and receiving a transaction record for the further expected transaction, for a series of successive transactions between the other energy supplier and the other customer, each of the series of successive transactions between the other energy supplier and the other customer identifying a succeeding transaction in the series through a business rule.

11. The method of claim 3 further comprising receiving from the energy supplier an update for the first business rule and applying the updated first business rule to future transaction completed between the energy supplier and the customer.

12. The method of claim 3 further comprising providing the energy supplier electronic access to transaction records for the series of successive transactions.

13. The method of claim 1 wherein processing the second transaction record based on whether the second transaction between the energy supplier and the customer was completed within the acceptable time period comprises:

conditioned on the second transaction between the energy supplier and the customer not being completed within the acceptable time period:
processing the second transaction record;
sending a message to the energy supplier indicating that the second transaction between the energy supplier and the customer was not completed within the acceptable time period; and
storing a record indicating that the second transaction between the energy supplier and the customer was not completed within the acceptable time period.

14. A computer readable storage medium having embodied thereon a computer program, the computer program comprising instructions for:

receiving electronically, at a computer system, a first transaction record from an energy supplier that is located in a first jurisdiction and that supplies energy to customers in an energy market, the first transaction record being received according to a first protocol, and the first transaction record having a first format and including first transaction data stored in the first format and describing a customer enrollment transaction between the energy supplier and a customer located in a second jurisdiction;

converting, by the computer system, the first transaction data from the first format into a second format;

configuring business rules based on the first jurisdiction of the energy supplier and the second jurisdiction of the customer, the configured business rules being appropriate for handling transactions in accordance with jurisdictional requirements for energy transactions engaged in by the energy supplier;

accessing, from among the configured business rules by the computer system and based on information in the first transaction record, a first business rule describing a response business transaction expected to be completed between the energy supplier and the customer in response to the customer enrollment transaction, the first business rule including an acceptable time period in which the response business transaction is required to be completed to comply with jurisdictional requirements imposed by the first jurisdiction of the energy supplier and the second jurisdiction of the customer;

receiving, by the computer system, a second transaction record from the energy supplier including second transaction data describing completion of the response business transaction and including a time attribute related to a time of completion of the response business transaction;

processing, by the computer system, the second transaction record using the first business rule, the processing including:

based on the time attribute included in the second transaction record received from the energy supplier, determining a time period between completion of the customer enrollment transaction between the energy supplier and the customer and completion of the response business transaction between the energy supplier and the customer;

comparing the determined time period with the acceptable time period included in the first business rule;

based on comparison results, determining, by the computer system, whether the response business transaction between the energy supplier and the customer was completed within the acceptable time period; and processing the second transaction record based on whether the response business transaction between the energy supplier and the customer was completed within the acceptable time period;

tracking, by the computer system, information related to business transactions between the energy supplier and the customer to identify a schedule of recurring transactions that occur in a lifecycle of business between the energy supplier and the customer;

determining, by the computer system and in response to processing the second transaction record, a next expected energy usage business transaction between the energy supplier and the customer and a second time period of when the next expected energy usage business transaction is expected to be received based on the tracked schedule of recurring transactions that occur in the lifecycle of business between the energy supplier and the customer;

storing, by the computer system, at least some portions of the first transaction record and the second transaction record; and displaying the results of the processing and storing, by the computer system, to at least one of the energy supplier and the customer.

15. The method of claim 1 further comprising using the tracked schedule of recurring transactions that occur in the lifecycle of business between the energy supplier and the customer to ensure that appropriate business transactions are processed at right times by appropriate energy suppliers and appropriate customers.

16. The method of claim 1:

wherein tracking information related to business transactions between the energy supplier and the customer to identify a schedule of recurring transactions that occur in a lifecycle of business between the energy supplier and the customer comprises tracking business transactions that have occurred between the energy supplier and the customer to predict future transactions that are expected to occur in the lifecycle of business between the energy supplier and the customer; and determining a next expected energy usage business transaction between the energy supplier and the customer and a second time period of when the next expected energy usage business transaction is expected to be received based on the tracked schedule of recurring transactions that occur in the lifecycle of business between the organization energy supplier and the customer comprises setting the next expected energy usage business transaction between the energy supplier and the customer in accordance with the predicted future transactions that are expected to occur in the lifecycle of business between the energy supplier and the customer.

17. The method of claim 1:

wherein tracking information related to business transactions between the energy supplier and the customer to identify a schedule of recurring transactions that occur in a lifecycle of business between the energy supplier and the customer comprises tracking time periods of business transactions that have occurred between the energy supplier and the customer to identify a timing schedule of transactions that have occurred in the lifecycle of business between the energy supplier and the customer; and determining a next expected energy usage business transaction between the energy supplier and the customer and a second time period of when the next expected energy usage business transaction is expected to be received based on the tracked schedule of recurring transactions that occur in the lifecycle of business between the energy supplier and the customer comprises determining the second time period of when the next expected energy usage business transaction is expected to be received based on the tracked timing schedule of transactions that have occurred in the lifecycle of business between the energy supplier and the customer and providing an exception condition when the next expected energy usage business transaction is not completed within the second time period.

18. The method of claim 1 wherein tracking information related to business transactions between the energy supplier and the customer to identify a schedule of recurring transactions that occur in a lifecycle of business between the energy supplier and the customer comprises monitoring a sequence of business transactions over a course of a lifecycle of a business process between the energy supplier and the customer.

19. The method of claim 1 further comprising matching a request business transaction with a corresponding response business transaction in order to determine whether the request business transaction and the corresponding response business transaction have satisfied the tracked schedule of recurring transactions that occur in the lifecycle of business between the energy supplier and the customer.

20. A computer system comprising:

at least one processor; and at least one memory coupled to the at least one processor having stored thereon instructions which, when executed by the at least one processor, causes the at least one processor to perform operations comprising:

receiving electronically a first transaction record from an energy supplier that is located in a first jurisdiction and that supplies energy to customers in an energy market, the first transaction record being received according to a first protocol, and the first transaction record having a first format and including first transaction data stored in the first format and describing a customer enrollment transaction between the energy supplier and a customer located in a second jurisdiction;

converting the first transaction data from the first format into a second format;
configuring business rules based on the first jurisdiction of the energy supplier and the second jurisdiction of the customer, the configured business rules being appropriate for handling transactions in accordance with jurisdictional requirements for energy transactions engaged in by the energy supplier;
accessing, from among the configured business rules and based on information in the first transaction record, a first business rule describing a response business transaction expected to be completed between the energy supplier and the customer in response to the customer enrollment transaction, the first business rule including an acceptable time period in which the response business transaction is required to be completed to comply with jurisdictional requirements imposed by the first jurisdiction of the energy supplier and the second jurisdiction of the customer;
receiving, by the computer system, a second transaction record from the energy supplier including second transaction data describing completion of the response business transaction and including a time attribute related to a time of completion of the response business transaction;
processing, by the computer system, the second transaction record using the first business rule, the processing including:
based on the time attribute included in the second transaction record received from the energy supplier, determining a time period between completion of the customer enrollment transaction between the energy supplier and the customer and completion of the response business transaction between the energy supplier and the customer;
comparing the determined time period with the acceptable time period included in the first business rule;
based on comparison results, determining, by the computer system, whether the response business transaction between the energy supplier and the customer was completed within the acceptable time period; and
processing the second transaction record based on whether the response business transaction between the energy supplier and the customer was completed within the acceptable time period;
tracking, by the computer system, information related to business transactions between the energy supplier and the customer to identify a schedule of recurring transactions that occur in a lifecycle of business between the energy supplier and the customer;
determining, by the computer system and in response to processing the second transaction record, a next expected energy usage business transaction between the energy supplier and the customer and a second time period of when the next expected energy usage business transaction is expected to be received based on the tracked schedule of recurring transactions that occur in the lifecycle of business between the energy supplier and the customer;
storing, by the computer system, at least some portions of the first transaction record and the second transaction record; and
displaying the results of the processing and storing, by the computer system, to at least one of the energy supplier and the customer.

* * * * *

UNITED STATES PATENT AND TRADEMARK OFFICE
CERTIFICATE OF CORRECTION

PATENT NO. : 8,046,238 B2  Page 1 of 1
APPLICATION NO. : 10/027664
DATED : October 25, 2011
INVENTOR(S) : Stuart J. Solomon It is certified that error appears in the above-identified patent and that said Letters Patent is hereby corrected as shown below:

In claim 16, column 14, lines 4-5, delete "organization energy" and insert --energy--, therefor.

Signed and Sealed this
Third Day of January, 2012

David J. Kappos
*Director of the United States Patent and Trademark Office*